(12) United States Patent
Levin et al.

(10) Patent No.: US 6,173,279 B1
(45) Date of Patent: Jan. 9, 2001

(54) METHOD OF USING A NATURAL LANGUAGE INTERFACE TO RETRIEVE INFORMATION FROM ONE OR MORE DATA RESOURCES

(75) Inventors: Esther Levin, Livingston, NJ (US); Shrikanth Sambasivan Narayanan, Riverside, CT (US); Roberto Pieraccini, Millington; Ilija Zeljkovic, Westfield, both of NJ (US)

(73) Assignee: AT&T Corp., New York, NY (US)

( * ) Notice: Under 35 U.S.C. 154(b), the term of this patent shall be extended for 0 days.

(21) Appl. No.: 09/058,107

(22) Filed: Apr. 9, 1998

(51) Int. Cl.⁷ .................................................. G06F 17/30
(52) U.S. Cl. .................. 707/5; 707/3; 707/4; 707/102
(58) Field of Search .................. 707/102, 3, 4, 707/5; 379/88.01, 900

(56) References Cited

U.S. PATENT DOCUMENTS

| | | | |
|---|---|---|---|
| 4,797,910 | * | 1/1989 | Daudelin ........................... 379/88.01 |
| 4,959,855 | * | 9/1990 | Daudelin .............................. 379/213 |
| 4,979,206 | * | 12/1990 | Padden et al. ..................... 379/88.01 |
| 5,331,554 | * | 7/1994 | Graham ..................................... 707/5 |
| 5,839,107 | * | 11/1998 | Gupta et al. .......................... 704/270 |
| 5,878,418 | * | 3/1999 | Polcyn et al. ........................... 707/10 |
| 5,895,464 | * | 4/1999 | Bhandari et al. ........................ 707/3 |
| 5,943,410 | * | 8/1999 | Shaffer et al. ............................ 707/2 |
| 6,026,392 | * | 2/2000 | Kouchi et al. ............................ 707/2 |
| 6,028,917 | * | 2/2000 | Creamer et al. ................. 379/100.01 |

FOREIGN PATENT DOCUMENTS

PCT/US99/07278    7/1999 (WO) .

OTHER PUBLICATIONS

Tsuchida H Et Al: An intelligent directory assistance system. Methodologies for Intelligent Systems, 3. Proceedings of the Third International Symposium, Turin, Italy, Oct. 12–15, 1998, pp. 160–169, cited as of particular relevance to claims 1–21 in the International Search Report for PCT Application No. PCT/US99/07278.

Kellner A Et Al: Padis An automatic telephone switchboard and directory information system Speech Communication, vol. 23, No. 1–2, Oct. 1, 1997, p. 95–111 cited as of particular relevance to claims 1–21 in the International Search Report for PCT Application No. PCT/US99/07278.

* cited by examiner

*Primary Examiner*—Wayne Amsbury
*Assistant Examiner*—William Trinh

(57) ABSTRACT

A method of using at least one natural language query to retrieve information from one or more data resources and further performing a requested action using the retrieved information is disclosed. At least one natural language query directed to retrieving particular information is received. At least one object from the natural language query is extracted. The relationship between each of the at least one extracted objects is determined. A semantic representation is created from the at least one extracted objects. The semantic representation is compared to a knowledge structure. The knowledge structure is comprised of one or more grammars which are extracted from a plurality of data resources. The semantic representations are matched to the grammar. A database query is generated based on the matched objects. The query is applied to one or more of the data resources and information is retrieved. The requested action is then performed using the retrieved information.

28 Claims, 4 Drawing Sheets

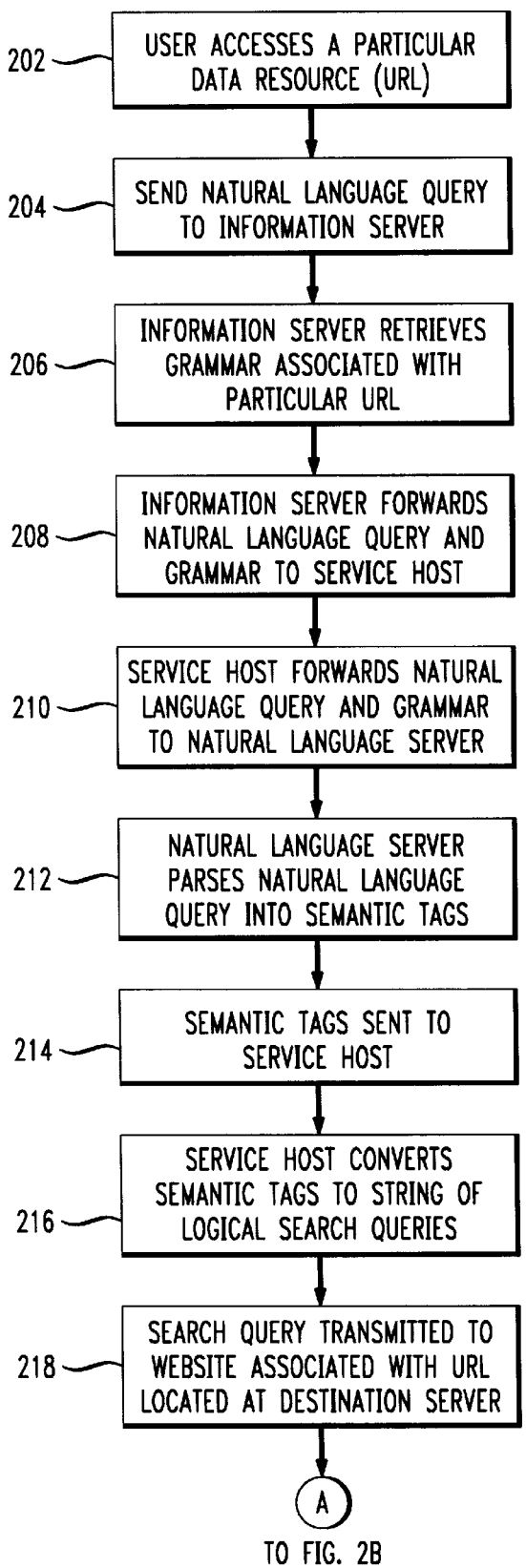

METHOD OF USING A NATURAL LANGUAGE INTERFACE TO RETRIEVE INFORMATION FROM ONE OR MORE DATA RESOURCES

TECHNICAL FIELD

The invention relates to a method for using a natural language query for retrieving information from one or more data resources and, more particularly, a method for using a natural language query for automatically retrieving and configuring a destination telephone number from existing data resources and using the destination telephone number to place a telephone call.

BACKGROUND OF THE INVENTION

Files or other resources on computers around the world may be publicly available to users of other computers through the collection of networks known as the Internet. The collection of all such publicly available resources, linked together using files written in Hypertext Mark-up Language ("HTML") is known as the World Wide Web ("web").

A user of a computer that is connected to the Internet may cause a program known as a client to request resources that are part of the web. Server programs then process the requests to return the specified resources. A standard naming convention has been adopted, known as a Uniform Resource Locator ("URL"). This convention encompasses several types of location names, presently including subclasses such as Hypertext Transport Protocol ("http"), File Transport Protocol ("ftp"), gopher and Wide Area Information Service ("WAIS").

The various resources accessible via the web are created and maintained by many different people on servers located all around the world, and may be created for many different purposes. Many individuals and businesses now have their own web sites that can be visited by people "surfing" the web. These web sites typically provide information on a myriad of subjects such as sports, business, news and even community events. For example, many web sites exist which provide useful information about a particular business establishment such as office locations, customer service telephone numbers and information about the products and/or services that the business offers to the consumer.

In many cases, an individual accessing such a web site is looking for particular information such as information about a particular product. However, the individual might desire additional information about the particular product, which is not available from the web site. Typically, the individual will place a telephone call to the customer service department of the business entity to obtain the additional information. For example, the individual may want to know if an electronics store carries a particular product, such as a particular brand name television and the price of the television. Such information may not be contained in the web site and the individual may have to call the electronics store to receive the desired information. This multiple step process of searching and retrieving information from the Internet and then using a conventional phone line to call the business establishment for still more information or conducting business is cumbersome and time consuming.

In other cases, the individual may generally know the location of a particular establishment, but may not know the exact address or the name of the establishment. For example, an individual may know that there is an electronics store in their town on Route 4, but may not know the name of the electronics store. The individual may access a web site that contains information about the particular town to try to identify the exact name and location of the electronics store. Conventional searching techniques require a hierarchical step by step query approach to locate the desired information. For example, the individual may enter the address of the store, if known, or the type of store to get a listing of relevant information. However, such searching may require many steps and, in many instances, the available search queries may not be compatible with the known information. As such, the searching many require additional unnecessary search queries in order to obtain the desired information.

SUMMARY OF THE INVENTION

In accordance with the present invention, a method of using at least one natural language query to retrieve information from one or more data resources and further performing a requested action using the retrieved information is disclosed. At least one natural language query directed to retrieving particular information is received. At least one object from the natural language query is extracted. The relationship between each of the at least one extracted objects is determined. A semantic representation is created from the at least one extracted objects. A database query is generated based on the semantic representation using a pre-defined knowledge structure. The query is applied to one or more of the data resources and information is retrieved. The requested action is then performed using the retrieved information.

In another embodiment of the present invention, the information retrieved is a telephone number for a particular destination and the requested action is the placement of a telephone call using the retrieved telephone number.

In another embodiment of the present invention, the requested information is retrieved by querying multiple data resources in which each data resource contains a different type of information. Objects are extracted from the natural language query which correspond to different types of information. Each information type is associated with a particular data resource. A query is generated for each object and applied to the corresponding data resource. The retrieved information may be integrated into a query to a different data resource to retrieve additional information. The retrieved information may be used to perform a requested action such as the placement of a telephone call.

BRIEF DESCRIPTION OF THE DRAWINGS

In the drawings, where like numerals refer to like elements throughout the several views:

FIGS. 2a and 2b are flow charts illustrating the implementation of a query by the system of FIG. 1.

DETAILED DESCRIPTION OF THE INVENTION

Figure 1:
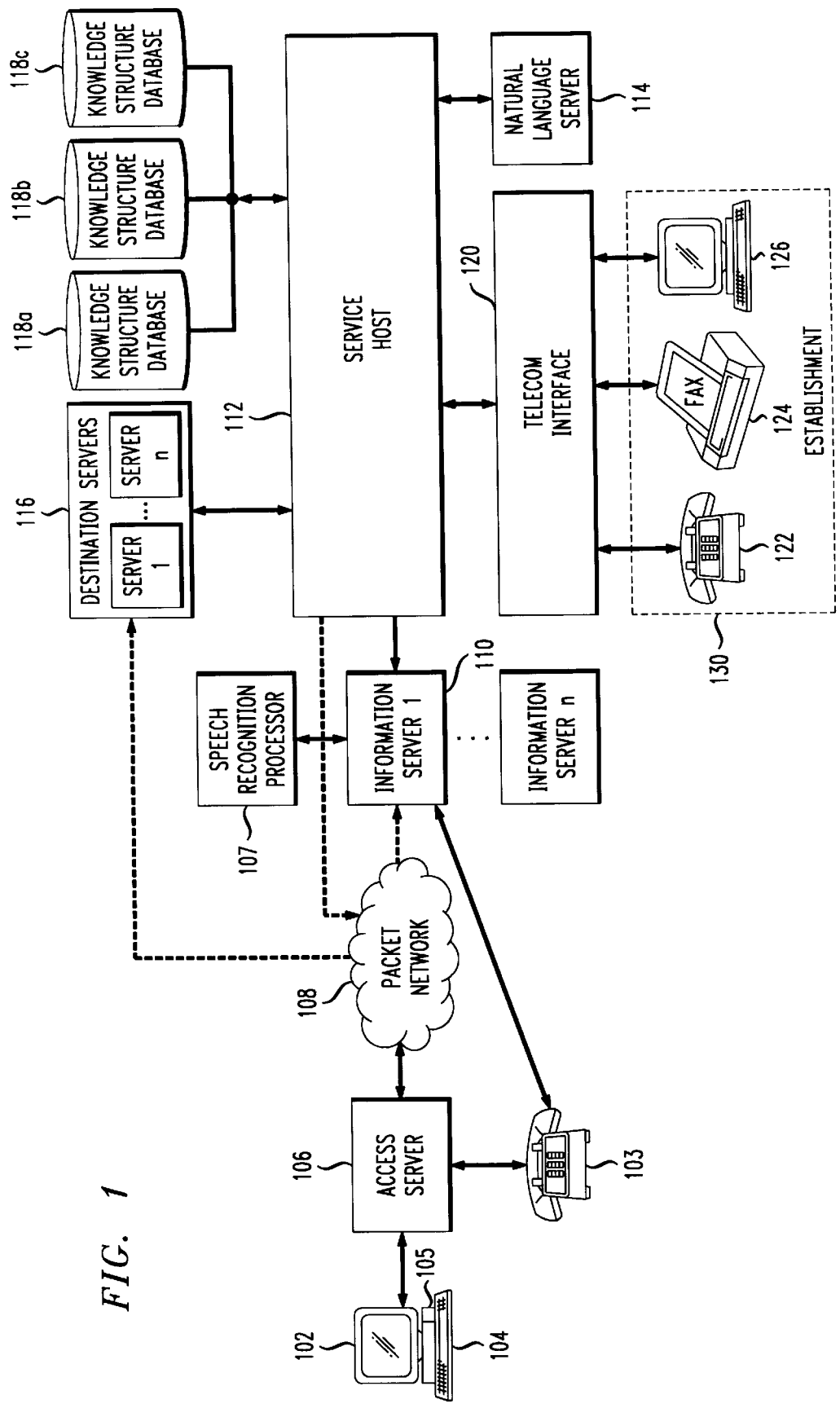
FIG. 1 is a simplified diagram of an exemplary system embodying the invention.

For purposes of illustration, FIG. 1 is a simplified diagram of an exemplary system 100 embodying the invention. A user desires to establish a real-time connection to a particular establishment 130 (e.g., a telephone call to a representative of the establishment 130) by extracting relevant information from one or more data resources. In accordance with an embodiment of the present invention, the data resources are web sites identified by a particular URL. It is to be understood by those skilled in the art that the data resources can be any type of data file that may be accessed by the user over a packet network 108.

Using a personal computer (PC) 102, a user establishes a connection with packet network 108 via an access server 106. The user may also use a telephone 103 to connect to the packet network 108. Typically a modem connection (not shown) may be used to connect the PC 102 to the packet network 108 in a conventional manner. The packet network 108 can be, for example, the Internet or an Intranet. The packet network 108 may comprise a single packet network or a multiplicity of packet networks, such as, e.g., the "baclkbone" networks comprising the Internet. The access server 106 may illustratively, be a server connected to the Internet provided by, e.g., an Internet service provider, or may be any other server used for providing access to the packet network 108.

As illustrated, the packet network 108 is connected to a plurality of information servers 110 which host a plurality of information services or web sites.

An information server 110 includes grammars that represent the language (written or spoken) used by customers for accessing the information related to that particular service or site.

When the information server 110 receives a natural language query, the information server 110 transmits the natural language query and the corresponding grammar to a service host 112 in a predefined protocol that characterizes the service host.

In general the service host 112 can communicate with a plurality of information servers, each one of them representing a particular service or site. Any information server that complies with the protocol defined by a service host can use the services provided by that service host.

The service host 112 coordinates with the information server 110, the associated data resources, and the natural language (NL) server 114 to process the natural language query. The service host 112 sends the natural language query and the specific grammars provided by the information server 110 to the NL server 114. The NL server 114 parses the natural language query and sends the resulting semantic tags to the service host 112. When the service host 112 receives the semantic tags, and if the service host 112 decides, based on the rules, that there is enough information to retrieve data from the data resources, generates a search query. The service host 112 uses ad-hoc transducers (a.k.a knowledge structures) to convert semantic tags into search queries (e.g. SQL queries) for each particular data resource. The knowledge structures are stored in the databases 118 (a–n). The search query is used to access data resources contained in, typically, a plurality of destination servers 116. It is to be understood by those skilled in the art that more than one data resource may be accessed from a single destination server, or alternatively, multiple data resources contained in different destination servers may be accessed at the same time. These destination servers may be dedicated to the particular service host and/or publicly available and accessed through the packet network 108 (not shown in FIG. 1).

An example of a search query that may be generated is a request for a telephone number corresponding to a particular establishment. Once the appropriate telephone number of the establishment is retrieved call connection can be provided by a standard telecom adjunct at the service host 112 i.e., the call to the telephone 122 of the establishment 130 is initiated. Once a connection is established with the called party (e.g., the establishment 130) a direct connection is established between the user and the called party (e.g., employee of establishment 130). Alternatively, instead of a telephone call, the user can connect to the establishment's facsimile machine 124 or personal computer 126.

Figure 2B:
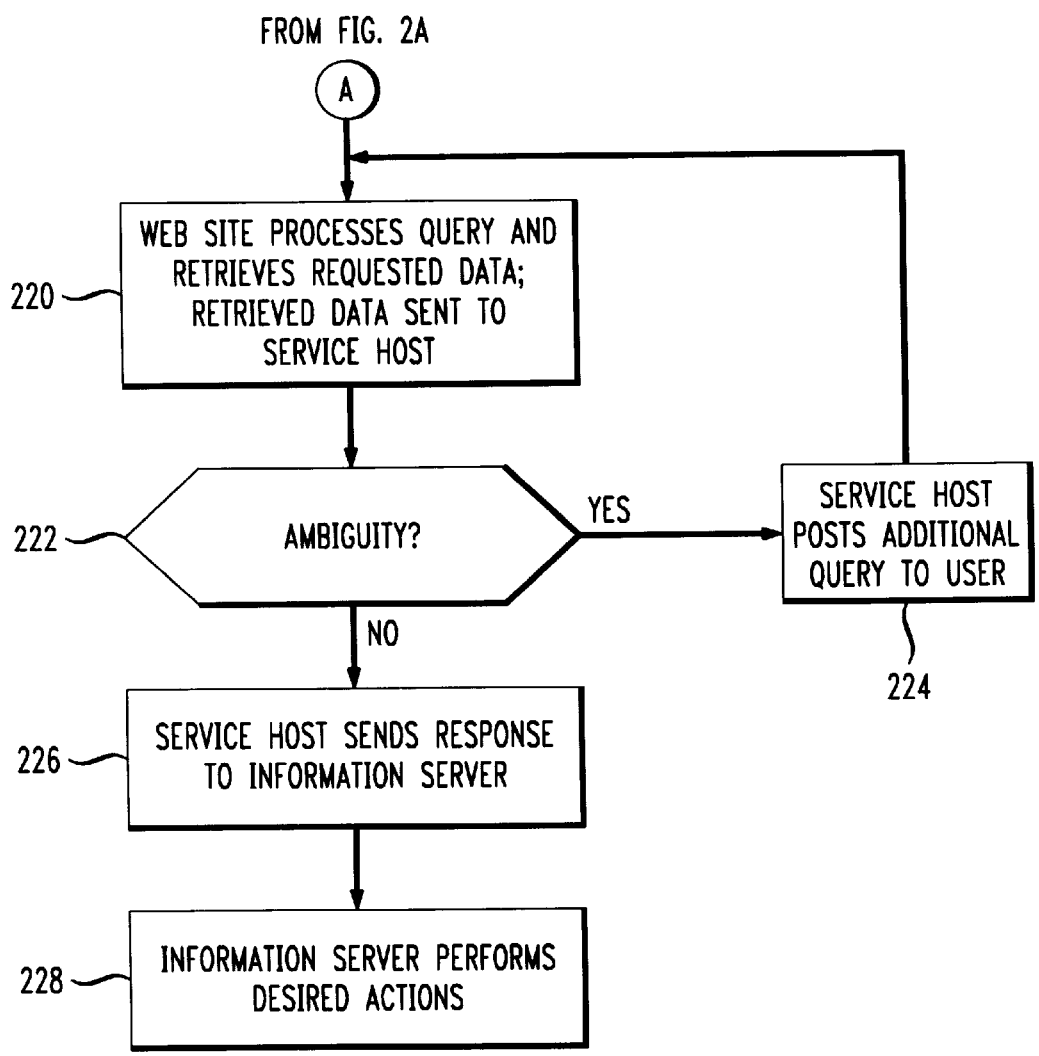

A more detailed example of how the present invention may be implemented is set forth in FIGS. 2a and 2b. A user may access a particular data resource such as a directory for the town of Westfield by inputting the URL http://www.westfield.com (step 202). The URL for that Westfield data resource is inputted into PC 102 either by typing the request using a keyboard 104 or by speaking the request into a microphone 105. Alternatively the information server 110 can be directly accessed through a telephone 103: (1) an internet telephone connected to the access server (2) a conventional PSTN telephone connected to the information server assuming that the information server has a telecom adjunct and the capability of processing spoken requests. Spoken requests either from a PC microphone 105 or from a telephone 103 can be handled by a speech recognition system residing at the information server.

The PC 102 dials into an access server 106 that is connected to the Internet or other database service via a logical network interface (not shown). The logical network interface may be a local area network (LAN), a Serial Line Internet Protocol (SLIP) connection over a modem, an ISDN port or via a connection to a special LAN such as an ATM LAN or a LAN that offers bandwidth reservation. The invention is independent of the actual modality of call placement. As mentioned before, call placement can occur from a PSTN (made possible by means of a telecom adjunct at the server) or Internet telephone.

In general, the information server that is accessed can either be a specific web site, such as, but not limited to the web site of a company, or a dedicated information resource web site. The dedicated information resource web site can be, for example, a single web site or a combination of web sites which contains a significant amount of general reference information which relates to a particular subject matter, such as a national directory of movie information. A web site can also be dedicated to handle a particular subject matter. For example, a web site can contain movie and theater information for all movie theaters in the United States. The information server to be accessed may be characterized by a URL and/or a telephone number.

Once an information server is accessed, the user can send a text or a spoken query requesting a particular action or service (step 204), for example: "call the pizza place on Main Street in Westfield". The query is received by the access server 106 and the natural language query is sent to the information server 110 via packet network 108. It is to be understood that the packet network 108 may be connected to a plurality of information servers which each relate to one or more particular information services, or there may be a single centralized information server 110 which is accessed by all information services which are capable of receiving and processing natural language queries. The information server 110 is preferably located in one or more adjunct servers. Each information server 110 contains at least some of the data resources (e.g., URLs and associated site/service-specific grammars) capable of receiving and responding to a natural language query.

If an information server is enhanced for voice access, standard speech application programming interfaces may be used to provide a means for communicating between the user and the web site. Information servers include grammars that reflect the language used by people to request or to describe information services specific to that particular site. The grammar should try to capture all possible reasonable sentences or queries.

Once the information server receives the user's query, it retrieves the relevant grammars for processing the query (step 206). Following this, a communication between the information server 110 and the service host 112 will be established. The information server will send the user's query and the retrieved grammars to the service host (step 208). The service host 112 coordinates the activities of the information server 110 with a NL server 114 and at least one destination server 116 to process the natural language query and perform the requested action. The service host 112 includes a dialog control program that manages interactions with users over several turns (e.g., it decides when to ask a question, when to give an answer, provides means for clarifying ambiguities, and provides error control and recovery during an interaction). The service host 112 then must determine what type of information is being requested as expressed in the user's natural language query. For example, is the query requiring an action, such as the placement of a telephone call, or requesting specific information, such as the location at which a particular movie is being shown. To parse the natural language query the service host uses a natural language server NL 114: the query and the grammar are sent to NL (step 210). An NL server typically embodies a parser, an example of which is described in Pieraccini, R., Levin, E., "A Spontaneous-Speech Understanding System for Database Query Applications," ESCA Workshop on Spoken Dialogue Systems—Theories and Applications, May. 30, Jun. 2, 1995, Vigs__, Denmark, which is incorporated by reference. The semantic representations are then received by the service host 112.

The NL server 114 parses the natural language query into a plurality of semantic tags (step 212) as will be described in detail hereinafter. The semantic tags are then sent from the NL server 114 to the service host 112 (step 214).

The service host 112 converts the semantic tags to a string of logical search queries (step 216). The conversion of the semantic tags into a search query is accomplished by a knowledge structure which provides a mapping between the semantic tags and the language used for querying the database in the selected application (e.g., SQL). This mapping is performed by an ad-hoc program developed for the particular application. The resulting knowledge structure is stored in databases 118. Standard techniques may be used for developing the ad-hoc program. For the example if a standard SQL database is used, the mapping will look like:

Input: Action: Call/Action_Object: Pizza_Restaurant/Location: Main Street/City: Westfield Output: SELECT telephone_number FROM pizza_restaurants WHERE location='Main Street' and 'city='Westfield';

It is obvious that Call should map into the attribute telephone_number, Pizza_Restaurant to pizza_restaurants, etc.

To summarize, a grammar (either handcrafted or automatically acquired using machine learning algorithms) is used to parse the natural language query to obtain a set of semantic tags that represent the query. The query can be received either as written text or can be translated from speech to text via a speech recognition system. For the query "call the pizza place on Main Street in Westfield", the parser generates a semantic representation such as "Action: Call/Action_Object: Pizza_Restaurant/Location: Main Street/City: Westfield". The semantic representation can then be used for generating a search query (e.g., in SQL) that will retrieve the corresponding information. In the case of the exemplary query, the telephone number for the particular pizza restaurant is retrieved from the data resource. An example of a system which is capable of processing such a query is described in Pieraccini, R., Levin, E.,"A Spontaneous-Speech Understanding System for Database Query Applications," ESCA Workshop on Spoken Dialogue Systems__Theories and Applications, May. 30, Jun. 2, 1995, Vigs__, Denmark which is incorporated by reference.

The system can implement a dialog control as that described in Pieraccini, R., Levin, E., Eckert, W., "AMICA, the AT&T Mixed Initiative Conversational Architecture," Proc. EUROSPEECH 97, September 1997, Rhodes, Greece which is also incorporated by reference. The above symbolic description of the natural language query is then analyzed according to a predefined set of rules.

The rules have to be defined ad-hoc for each application. For instance in the pizza restaurant application there might be rules that say:

If(Action_Object=Pizza_Restaurant) then
    User must provide: Location and City So, For instance, if the rule is activated (i.e. when Action_Object=Pizza_Restaurant), and the user had given the Location already, the system will request the City.

If the service host 112, based on the rules, decides that there is enough information for performing a database access, the database query is generated. The database query is generally in one of the standard query languages (e.g. SQL). The service host 112 will have a table that maps topics to URL's, so it knows that if topic=Pizza_Restaurant, the URL to send the query to is www.njrestaurants.com. The search queries are forwarded to the web site associated with the URL transmitted by the user that is located at one of the destination servers 116 (step 218). The web sites process the query and retrieve data that is believed to respond to the query (step 220). The query results are transmitted to the service host 112. The service host 112 determines if there are any ambiguities with respect to the response (step 222) and, if so, forwards additional queries to the user to help to resolve the ambiguities (step 224). The service host 112 then sends the responses to the information server 110 (step 226).

If there are too many potential answers (for instance if there are two pizza places on Main Street in Westfield), one or more questions to the user are generated in order to disambiguate the query (e.g. Do you mean "Venezia" or "Bella Roma?"). The answers to the additional questions are used to formulate a new logical search query.

For this there might be additional rules like:

If(Action_Object=Pizza_Restaurant and Too-Many_Answers) then
    User must provide further clarifying information such as, for example, the name of restaurant OR exact address.

If the user does not provide enough information to achieve a single answer, the service host 112 might then list the possibilities and ask the user to chose one of them.

Parallel search queries can be launched from the original natural language query or parent query in order to fill in information that is missing from the original query. Typically such parallel queries are added by using a logical AND/OR relation. For example, the query "call ITALIAN RESTAURANT in WESTFIELD NEAR the INTERSECTION of EAST and BROAD STREET" can be segmented into two parallel searches queries. The first search query is directed to accessing a restaurant directory to list all Italian restaurants in Westfield. The second parallel search query is directed to accessing a street database to find all streets near the intersection.

Once the service host 112 determines that a single response matches the database query, the requested information is retrieved from the database. In the case of the present example, the appropriate telephone number of the calling party is retrieved and confirmed using dialog control. The information (i.e., phone number) is received by the service host 112 which then forwards the number to the information server 110 (step 226). The service host 112 then performs the desired action (step 228). In the above example, the service host would establish a telephone connection between the pizza restaurant and the user.

Call connection can be provided by a standard telecom adjunct at the service host, i.e., the call to the telephone 122 of the pizza restaurant is initiated. Once a connection is established with the called party (e.g., the pizza restaurant) a direct connection is established between the user and the called party (e.g., pizza restaurant owner). Alternatively, instead of a telephone call, the user can connect to the called party's facsimile machine 124 or personal computer 126. In an alternative embodiment, the user may input the natural language query using a telephone. In such a case, the user dials a telephone number to gain access to a particular Internet resource and speaks the natural language query, e.g., "call the pizza place on Main Street in Westfield." The query is received by a speech recognizer 107 connected to the information server 110. An example of a speech recognizer which may be used is disclosed in L. Rabiner and B-H.Juang, "Fundamentals of Speech Recognition" Prentice Hall, Englewood Cliffs, N.J., 1993, which may be incorporated by reference. The speech recognizer translates a spoken query into the corresponding text for and returns it to the information server.

Described herein are further details of the functional aspects of the service host 112. In addition, to providing communication routing, the service host provides controller functionality. An integral functional component of the service host is a controller that uses the semantic representations obtained from the NL server to create a knowledge structure. The controller acts upon a strategy based on a sequence of operations (actions) and rules (see reference (2)). The sequence of operations determines which of a finite number of predetermined functions is invoked at any step of the processing. One of the predetermined functions that was mentioned previously is the interfacing with the natural language server to obtain a symbolic representation of the user's query i.e., semantic tagging. The other functions include interfacing with a speech generation mechanism to produce a spoken question or answer, and performing a search query to a database using the semantic tags obtained from the natural language server. The decision on which function to invoke is based on rules on the current information content of the controller. The information content corresponds to:

1— the symbols generated by the NL parser that represent the current and the previous user's sentences
2— the information extracted from the database(s)
3— information generated by the controller itself (for instance the count of how many times a question is asked)

Each semantic representation is identified as a particular object. The objects are then implemented by one or more knowledge structures which represent an intelligent search strategy that is used to interpret the query and ultimately retrieve the desired information from one or more data resources to perform a desired action. The knowledge structures are stored in one or more databases 118a, 118b, 118n. The knowledge structures are comprised of a plurality of objects. Each object is placed in a class and defined by unique properties such as, but not limited to, location, color, and size. This information serves as an identifier tag for the object. A class is a broad identifier that can describe a group of objects that share some attributes. For example, a class may be restaurants which would include all eateries associated with a particular data resource.

The objects are further arranged in different categories based on the inherent attributes of the particular object. Examples of such categories include, but are not limited to, callable objects, landmark objects, and functional objects.

Callable objects are objects associated with telephone numbers (and/or fax, email) such as, but not limited to, people and businesses i.e., objects upon which an action such as calling or messaging can be performed. Callable objects are organized into classes in a hierarchical database. Examples of callable objects are restaurants, stores, services, entertainment and churches. Each callable object has a knowledge structure associated with it. An example of a knowledge structure for a restaurant is illustrated below:

<restaurant>→(diner, American_restaurant, fast food, Italian, Chinese)
<restaurant>→(expensive, low price,_)
<restaurant>→(drive through, take out, formal, _)
<restaurant>→(name, address)
<restaurant>→(telephone number, fax number, email address)

The callable objects are further arranged in a hierarchy that results in the knowledge structure producing a description of the particular callable object that is used to retrieve the desired information from one or more data resources. An example of a knowledge structure representing a hierarchy of information relating to a particular callable object is shown as follows:

<Italian>IS_A <restaurant>(where IS_A specifies inheritance)

Now, <Italian>is also associated with attributes such as food types, for example, <Italian>→(pizza, pasta, general food)

Such an organization of objects results in multi-level inheritance. For example, =><pizza>IS_A <Italian>IS_A <restaurant> (two level inheritance)

Hence, when a query regarding "pizza" places is made it will automatically include all Italian restaurants as well, all though many of them may not explicitly advertise themselves as pizza restaurants.

The second category of objects are landmark objects. Landmark objects are objects that relate typically in a geographic manner to the desired information but are provided for a contextual basis. Examples of landmark objects include, but are not limited to, streets, parks, ponds, monuments, and important buildings.

Another category of objects are functional objects. Functional objects determine the relationships between one or more objects, such as between callable objects and landmark objects or between two callable objects or two landmark objects. Examples of such functions are "next to", "across from" and "north". All of these objects are stored in one or more databases. An example of a knowledge structure that may be used to interpret functional objects is as follows:

<ClblObj>[near] [intersection] OF <South>STREET and <north>AVENUE In the above example the function [intersection(<street1>, <street2>)] determines geographical coordinates of the intersection of two streets. Similarly we can define functions denoting proximity, such as "near". For example, the function [near(geogr_coord1, geogr_coord1>)] gives [near] value, perhaps ranging between (0. To 1.) to provide a relative measure of proximity.

AN EXAMPLE USING MULTIPLE RESOURCES

A user calls a toll free number that offers information services for the entire state. The information server component of this service as a basic feature would be configured with names of towns, counties, and other landmark locations. Further, its grammar would embody general concepts about various information resources: restaurants, movie theaters, transportation, banks. Notice at information server level, the grammar contains no details of any specific information resource i.e., it knows about "banks, financial institutions, credit unions" and not specific names such as "Fleet Bank, Affinity Credit Union etc.". Similarly, for restaurants the language model embodies something like:

<restaurant>→(diner, American_restaurant, fast food, Italian, Chinese)

<restaurant>→(expensive, low price,_)

<restaurant>→(drive through, take out, formal,_)

while not including specifics such as,

<restaurant>→(name, address)

<restaurant>→(telephone number, fax number, email address)

These kinds of specific information will be retrieved from multiple resources during consecutive actions of the search, real-time, when the query is made. The reason for this to strategy is because these types of information typically (1) are contained in several different database resources (restaurant resources, maps database, financial information resources etc.) (2) tend to change with time and need to be current at the time of query.

Example 1

Query: Can you help me locate a pizza place near the intersection of Main and Broad Streets in Westfield?

Figure 3:
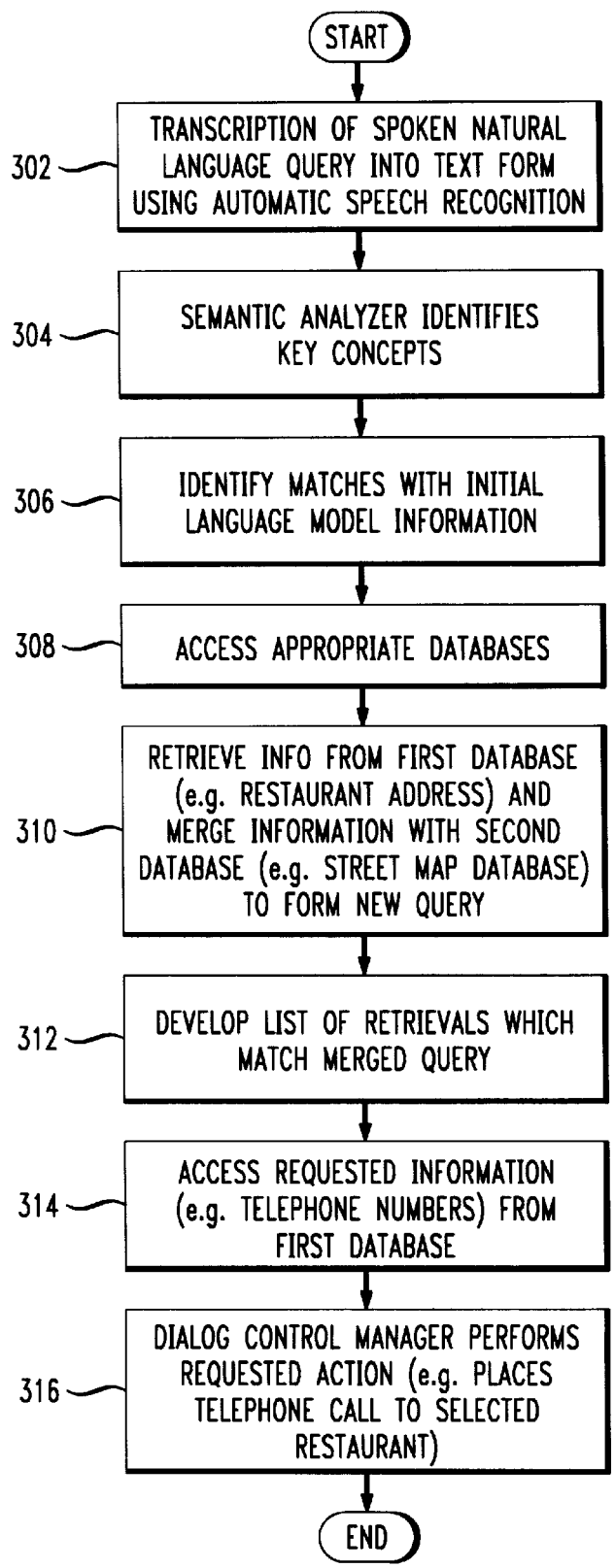
FIG. 3 is a flow chart illustrating the creation of a knowledge structure from a natural language query.

One way of processing the above query is as follows and is illustrated in FIG. 3. The first step is transcription of the above query into text form using automatic speech recognition, if it is a spoken utterance (step 302). In the second step the semantic analyzer identifies key concepts such as <pizza place>, <intersection>, <Main Street>, <Broad Street>, <Westfield>(step 304). In the third step, based on matches with the initial language model information as described above, the town name <Westfield>, <pizza>IS_A <restaurant>, <streets>IS_A <location>will be identified (step 306). Given that, this will trigger real-time access of the databases (step 308):

(1) Restaurant database, with the retrieval restricted by town name <Westfield>, restaurant type <pizza>and generate all Italian restaurants in Westfield (2) A street map database for Westfield and generate geographical coordinates for intersection of main and broad streets In the fourth step, the addresses from the restaurant database (from (1) above) is retrieved and mapped with the street map database (from (2) above) (step 310). Finally, the results of merging these two information sources using the functional objects <near>and <intersection>will result in a ranked list of possible Italian restaurants near the intersection of main and broad streets in Westfield (step 312). In the fifth step, all the telephone numbers of those restaurants will be accessed from the restaurant database (step 314). Finally, the dialog control manager after confirming with user (and getting the choice of selection if there are more than one selection as a result of the query) will complete the call to the selected restaurant (step 316).

Example 2

Query: Can you connect me to the loan officer of the Fleet Bank in Westfield?

Like in the previous example, the initial concepts of <bank>, <Westfield>will be identified. The bank database for the state will be first retrieved and in turn information on Fleet Bank in Westfield will be retrieved.

Assuming that Fleet Bank has its own website (perhaps with enhanced voice dialing features) the next step will retrieve the appropriate loan officer telephone number for the Fleet Bank in Westfield and complete the telephone call. (Note dialog control will facilitate the user with confirmations etc. before actual call connection is made).

While the present invention has been described in connection with the illustrated embodiments, it will be appreciated and understood that modifications may be made without departing from the true spirit and scope of the invention.

We claim:

1. A method of using a natural language query to retrieve information from one or more data resources and using said information to perform a requested action comprising:

receiving a natural language query directed to retrieving said information;

creating one or more semantic representations from said natural language query, said semantic representations extracting identified objects from within said natural language query;

processing the natural language query to generate at least one database query, said processing step including making a determination based on the identified objects as to which data resources should be queried;

using said at least one database query to retrieve said information from said plurality of data resources; and using said retrieved information to perform said requested action.

2. The method of claim 1 wherein said step of using said retrieved information to perform said requested action further comprising the steps of:

determining the action requested based on the identified objects and the relationship between each object;

merging the information retrieved from each database query based on said determined relationship; and performing the requested action.

3. The method of claim 1 wherein said information is a telephone number.

4. The method of claim 3 wherein said requested action is the placement of a call to a particular destination using said telephone number.

5. The method of claim 3 wherein said requested action is the sending of a facsimile transmission to a particular destination using said telephone number.

6. The method of claim 1 wherein said natural language query is in text form.

7. The method of claim 1 wherein said natural language query is received as speech.

8. The method of claim 1 wherein at least one of the data resources is an Internet site.

9. The method of claim 1 wherein at least one of the data resources is an intranet site.

10. A method of retrieving a telephone number for a particular destination from a plurality of Internet sites and using said telephone number to place a call to the particular destination comprising:

receiving a natural language query directed to retrieving a telephone number for a particular destination;

extracting at least one object from the natural language query;

creating one or more semantic representations from the at least one extracted objects;

comparing the one or more semantic representations to a knowledge structure, said knowledge structure comprised of objects and relations categorized from a plurality of data resources;

generating at least one search query based on said comparison;

transmitting said at least one search query to said plurality of Internet sites;

matching the at least one search query to one or more callable objects, at least one of said callable objects being associated with a telephone number; and placing a telephone call to the destination associated with the matched callable object.

11. The method of claim 10 wherein said natural language query is in text form.

12. The method of claim 10 wherein said natural language query is received as speech.

13. The method of claim 10 wherein said natural language query is generated by a personal computer.

14. The method of claim 13 further comprising the step of:

establishing a connection between said personal computer and said destination.

15. The method of claim 13 wherein said step of matching the search query to one or more callable objects further comprising the steps of:

determining if more than one match arises from said matching step, and if more than one match occurs generating one or more queries which are transmitted to the personal computer.

16. The method of claim 15 further comprising the steps of:

receiving additional information from said personal computer in response to said one or more queries, and using said additional information to eliminate at least some of the matches.

17. A method of using a natural language query to receive information from a plurality of Internet sites, each Internet site comprising a particular type of information comprising:

receiving said natural language query;

identifying objects from said query;

categorizing each object by type of information;

matching each object to a particular Internet site based on its categorization;

generating a database query for each object;

applying each database query to the particular Internet site identified;

retrieving the requested information from each Internet site;

using the identified objects to interpret the information requested for by the natural language query;

merging the information retrieved from each database query based on said interpretation; and providing the requested information.

18. The method of claim 17 wherein said step of developing a database query further comprises:

identifying information extracted from an Internet site in response to a previous database query; and integrating said extracted information with the identified object to generate a new database query.

19. The method of claim 17 further comprising the step of:

using said retrieved information to perform a requested action.

20. The method of claim 19 wherein said retrieved information is a telephone number and said requested action is initiation of a telephone call using said telephone number.

21. The method of claim 19 wherein said retrieved information is a telephone number and said requested action is initiation of a facsimile transmission using said telephone number.

22. A method of using a natural language query to retrieve information from a plurality of Internet sites and using said information to perform a requested action comprising:

receiving a natural language query directed to retrieving said information;

processing the natural language query to generate at least one database query, said processing step including identifying objects within the natural language query and, based on the identified objects, determining to which Internet sites each database query should be sent;

using said at least one database query to retrieve said information from said plurality of identified Internet sites; and using said retrieved information to perform said requested action.

23. The method of claim 22 wherein said step of using said retrieved information to perform said requested action further comprising the steps of:

determining the action requested based on the identified objects and the relationship between each object;

merging the information retrieved from each database query based on said determined relationship; and performing the requested action.

24. The method of claim 22 wherein said information is a telephone number.

25. The method of claim 24 wherein said requested action is the placement of a call to a particular destination using said telephone number.

26. The method of claim 24 wherein said requested action is the sending of a facsimile transmission to a particular destination using said telephone number.

27. The method of claim 22 wherein said natural language query is in text form.

28. The method of claim 22 wherein said natural language query is received as speech.

* * * * *